United States Patent [19]
Sato et al.

[11] Patent Number: 5,305,429
[45] Date of Patent: Apr. 19, 1994

[54] INPUT APPARATUS USING THREE-DIMENSIONAL IMAGE

[75] Inventors: Makoto Sato, No. 4-30-42, Tsukushino, Machida-shi, Tokyo; Yukihiro Hirata, Machida, both of Japan

[73] Assignees: Makoto Sato; Tokimec Inc., both of Tokyo, Japan

[21] Appl. No.: 613,982

[22] Filed: Nov. 14, 1990

[30] Foreign Application Priority Data

Nov. 30, 1989 [JP] Japan ................... 1-311127
Mar. 7, 1990 [JP] Japan ................... 2-56004

[51] Int. Cl.$^5$ ........................................ G06F 15/72
[52] U.S. Cl. ............................. 395/119; 395/155; 345/184
[58] Field of Search .................. 395/119, 155, 156; 340/706, 710; 345/184, 157

[56] References Cited

U.S. PATENT DOCUMENTS

| | | | |
|---|---|---|---|
| 4,742,473 | 5/1988 | Shugar et al. | 395/156 |
| 4,831,531 | 5/1989 | Adams et al. | 395/94 X |
| 4,868,549 | 9/1989 | Affinito et al. | 340/710 |
| 5,095,302 | 3/1992 | McLean et al. | 340/706 X |
| 5,184,319 | 2/1993 | Kramer | 340/706 X |

*Primary Examiner*—Mark K. Zimmerman
*Attorney, Agent, or Firm*—Wenderoth, Lind & Ponack

[57] ABSTRACT

An instruction point is movably provided in a three-dimensional space and can be freely moved by a finger tip of an operator. When the operator moves the instruction point to a desired position in the three-dimensional space and selects an arbitrary point, a three-dimensional position of the instruction point is measured and is input to a three-dimensional input apparatus. An image object is displayed in the three-dimensional space on the basis of image object information which has been previously stored. A check is made to determine whether or not the instruction point is virtually in contact with the virtual object in the three-dimensional space on the basis of the virtual object information and the position information of the instruction point. If it is determined that the instruction point is in contact with the image object, by limiting the mobility of the instruction point, a drag due to the contact with the virtual object is fed back, so that the operator can actually feel the existence of the virtual object.

10 Claims, 4 Drawing Sheets

INPUT APPARATUS USING THREE-DIMENSIONAL IMAGE

BACKGROUND OF THE INVENTION

The present invention relates to a three-dimensional input apparatus for inputting information to a computer and, more particularly, to a three-dimensional input apparatus which can execute an image process to move a stereo image by inputting the motion of a finger attached to a pointing device to a computer.

Hitherto, as a method of inputting three-dimensional information to a computer, there has been known a method of inputting coordinates from a keyboard as numerical values or a method of inputting three-dimensional information by operating a two-dimensional pointing device such as a mouse or the like a few times.

On the other hand, to input three-dimensional coordinates by a single operation, as shown in, e.g., JP-A-60-214036, there has been proposed an apparatus for inputting three-dimensional coordinates by providing a mechanism to detect a pressure which is applied to the bottom portion of the apparatus for a mouse and by enabling a coordinate inputting function in the vertical direction to be performed by the pressure detection in addition to a two-dimensional plane which could be input hitherto, or the like.

Further, as an apparatus which can directly indicate a position in a three-dimensional space, that is, as an apparatus which can indicate a position by locating some input means to a point to be input, for instance, there has been proposed a three-dimensional digitizer by the electromagnetic coupling as shown in JP-A-59-218539, a three-dimensional input apparatus in which instructing grips are provided at tip portions of a series of arms which are coupled by rotatable joints as shown in JP-A-1-94420, or the like.

An artificial real sense is at present being highlighted as means for realizing a smoother interface between human beings and a computer. The artificial real sense intends to allow an operation to be performed for a virtual object in a three-dimensional space which has been stored in a computer as if a human being executes an operation for an object which actually exists. Due to the artificial real sense, for instance, a stereo structure of a molecule displayed on a display screen can be rotated by being grasped in the hand and can be seen from a desired angle or a virtual clay modeling or an object work by using a potter's wheel can be performed.

In order to allow a human being to directly execute an operation for a virtual object in a three-dimensional space stored in the computer, three-dimensional position information which is selected by the human being, more practically, position information of the hand of the human being needs to be input to the computer and, in the case where a virtual object exists at the position selected by the human being, information about the virtual object, practically speaking, a drag which the hand should be received in the case where the hand of the human being touches the virtual object needs to be fed back from the computer to the human being.

However, a three-dimensional input apparatus which can satisfy such two functions, particularly, an apparatus having a function to feed back the drag from the virtual object does not exist so far. An apparatus having such functions is demanded.

SUMMARY OF THE INVENTION

It is an object of the invention to provide a three-dimensional input apparatus which can input a selected position to a computer by directly selecting a position in a three-dimensional space.

Another object of the invention is to provide a three-dimensional input apparatus which can operate a virtual object by feeding back a drag in the case of coming into contact with a virtual object stored in a computer.

Still another object of the invention is to provide a three-dimensional input apparatus which can input a selected position to a computer by selecting one position in a three-dimensional space.

Another object of the invention is to provide a three-dimensional input apparatus which can input selected positions to a computer by simultaneously selecting two positions in a three-dimensional space.

That is, according to the invention, an instruction point is movably provided in a three-dimensional space and can be freely moved by, for instance, a finger tip of an operator. When the operator moves an instruction point to a desired position in the three-dimensional space and selects an arbitrary point, the three-dimensional position of the selected point is measured and input to a three-dimensional input apparatus.

An image object is displayed in the three-dimensional space on the basis of virtual object information which has previously been stored. A check is made to see if a selected point and a virtual object are virtually in contact in the three-dimensional space by the virtual object information and the position information of the selected point. If it is determined that the selected point is in contact with the virtual object, by limiting a mobility of the instruction point, a drag due to the contact with the virtual object is fed back and the operator whose finger or the like is attached to the instruction point can actually sense the existence of the virtual object.

As mentioned above, according to the invention, by directly indicating a position in the three-dimensional space, the indicated position can be directly input to the computer. Further, in the case where the instruction point comes into contact with the virtual object stored in the computer, the drag is fed back and a sense of contact is derived.

The above and other objects, features, and advantages of the invention will become more apparent from the following detailed description in conjunction with the accompanying drawings.

DETAILED DESCRIPTION OF THE PREFERRED EMBODIMENTS

Figure 1:
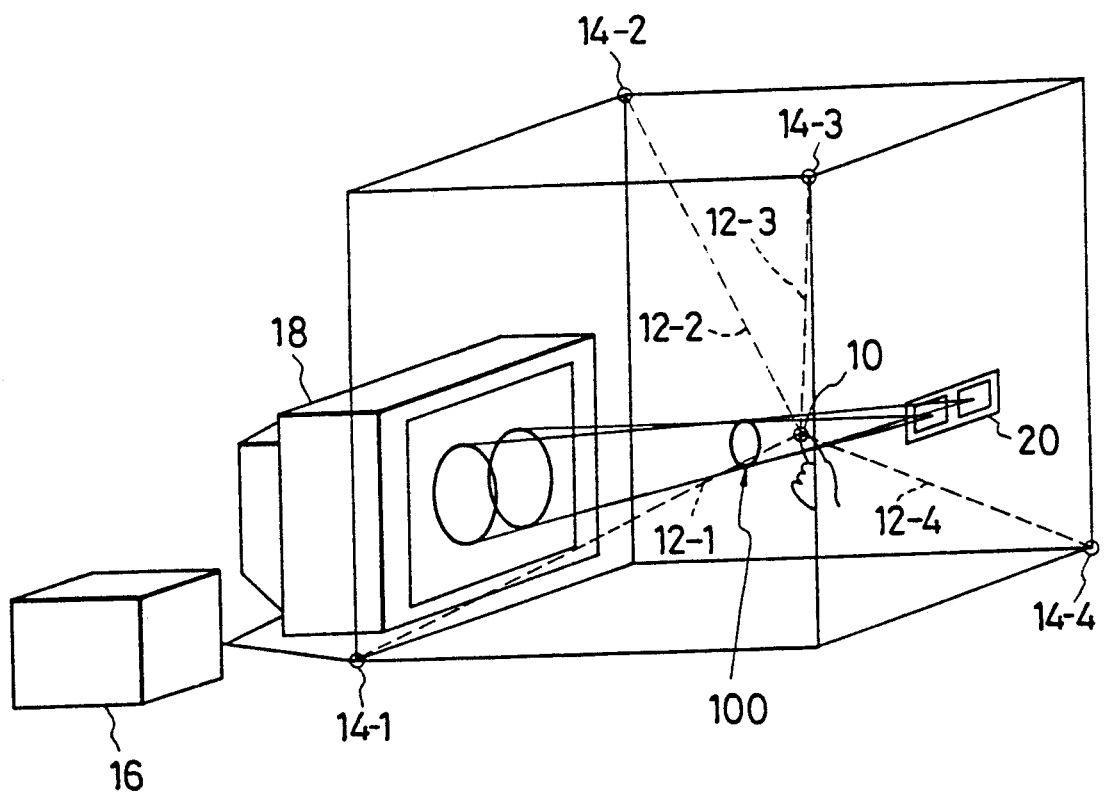
FIG. 1 is a diagram showing an external view of an apparatus according to a first embodiment of the present invention.

In FIG. 1, reference numeral 16 denotes a processing apparatus having a computer therein; element 10 is an instruction point; elements 14-1 to 14-4 are fulcrums elements; 12-1 to 12-4 are lines of variable lengths; element 18 is a CRT; and element 20 is a special pair of glasses used to see a stereo image.

Figure 2:
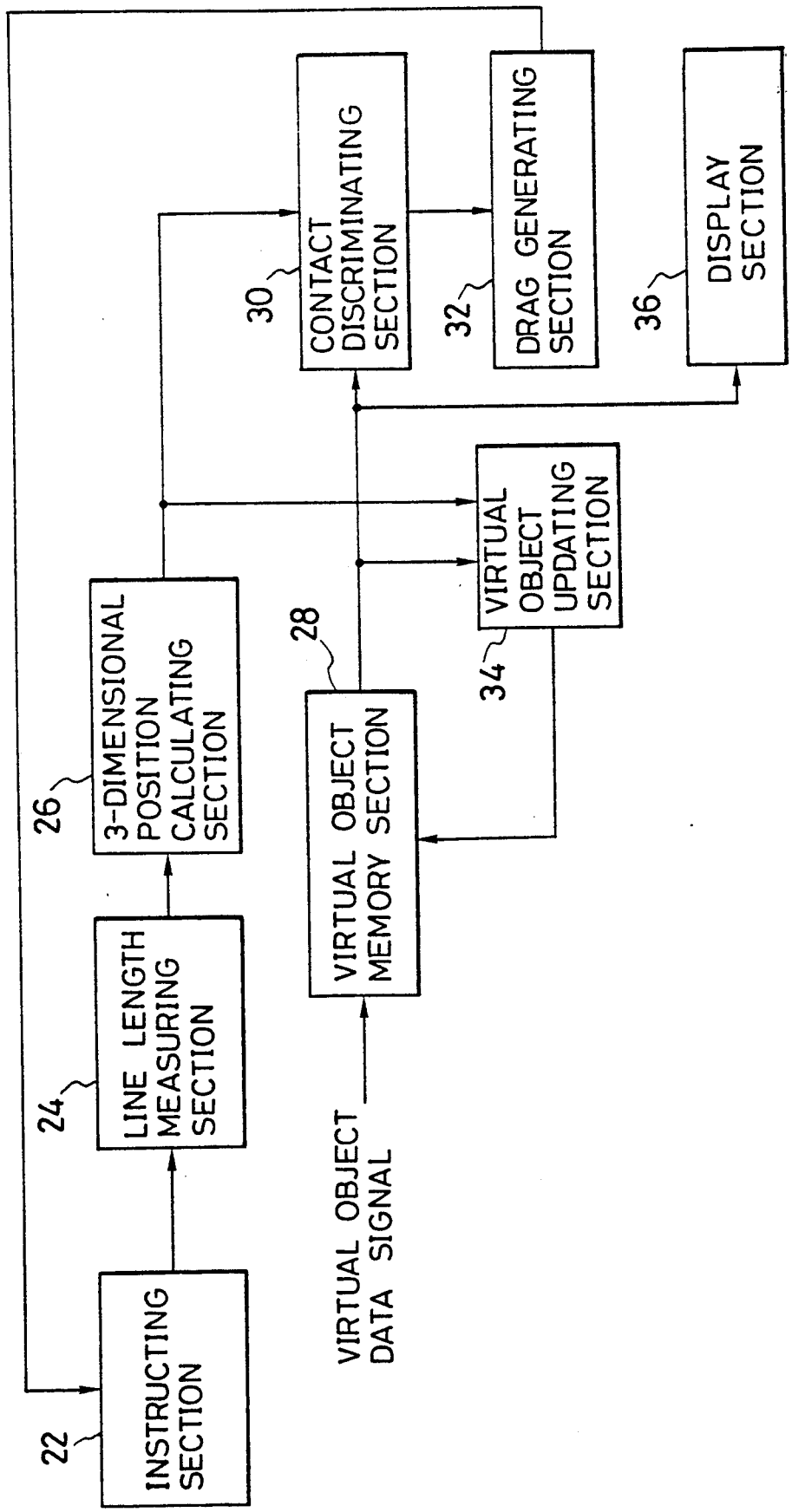
FIG. 2 is a block diagram according to the first embodiment of the present invention.

FIG. 2 is a block diagram of the present invention using the apparatus of FIG. 1.

In FIG. 2, reference numeral 22 denotes an instructing section; element 24 is a line length measuring section; element 26 is a three-dimensional position calculating section; element 28 is a virtual object memory section; element 30 is a contact discriminating section; element 32 is a drag generating section; element 34 is a virtual object updating section; and element 36 is a display section. Each of the above sections will now be described in detail hereinbelow.

First, as shown in FIG. 1, the instructing section 22 has the instruction point 10 which is specified in the following manner. That is, for instance, four vertexes, which are not adjacent to each other, of a cube in a three-dimensional space are defined to be at the fulcrums 14-1 to 14-4, respectively. Four lines 12-1 to 12-4 having variable lengths such as threads or the like are linearly rove one by one from the fulcrums 14-1 to 14-4, respectively. The instruction point 10 is held by the four lines 12-1 to 12-4. Therefore, the instruction point 10 is movable in the three-dimensional space and can stably exist at an arbitrary point in an area which is determined by the positions of the four fulcrums 14-1 to 14-4 without being supported by an external force. The four fulcrums 14-1 to 14-4 are not limited to the positions of four nonadjacent vertexes of a cube.

Practically, the instruction point 10 is attached to a finger tip of an operator. An arbitrary point to be selected in a three-dimensional space is directly indicated by the finger attached to the instruction point 10. At this time, even if the finger is removed, the instruction point 10 is stably held at the arbitrary point in the three-dimensional space and a force which is required for the instructing operation is not changed depending on the position of the instruction point 10. The lengths of the lines 12-1 to 12-4 of the variable lengths to indicate the instruction point 10, that is, the lengths from the fulcrums 14-1 to 14-4 to the instruction point 10 are determined by the position of the instruction point 10.

Figure 3:
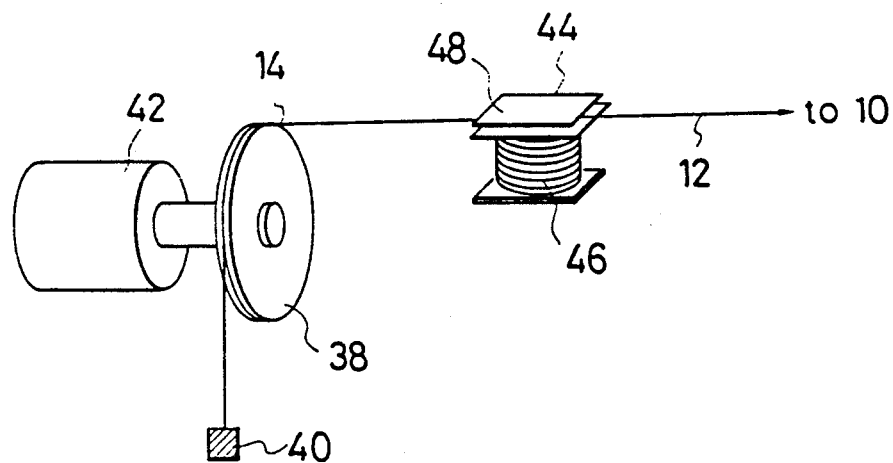
FIG. 3 is an explanatory diagram showing an embodiment of a selecting means, selected position measuring means, and a drag generating means in accordance with the present invention.

To linearly reeve the lines 12-1 to 12-4 from the fulcrums 14-1 to 14-4 to the instruction point 10 so as to have variable lengths, for instance, a construction as shown in FIG. 3 may be used.

The fulcrums 14-1 to 14-4 which are necessary for every lines 12-1 to 12-4 of the variable lengths, the line length measuring section 24, and the drag generating section 32 are realized by the structure of FIG. 3. Suffixes 1 to 4 are omitted in the diagram.

In FIG. 3, the line 12 is wound around a pulley 38 having a known diameter attached to a rotary encoder 42. A point on the pulley 38 which is come into contact with the line 12 is set to the fulcrum 14. Further, by attaching a weight 40 to a tip of the line 12, the line 12 can be linearly rove from the fulcrum 14 to the instruction point 10 so as to have a variable length. On the other hand, to stably hold the instruction point 10 at an arbitrary point in the three-dimensional space, strictly speaking, tensions of the lines 12-1 to 12-4 to hold the instruction point 10 must be controlled in accordance with the position of the instruction point 10. However, actually, it is sufficient to attach the weights 40 to the tips of the lines 14-1 to 14-4 and to equalize the weights of the respective weights of the lines 14-1 to 14-4.

The line length measuring section 24 shown in FIG. 2 measures the lengths from the fulcrums 14-1 to 14-4 of the lines 12-1 to 12-4 of the variable lengths to the instruction point 10. That is, as shown in FIG. 3, when the instruction point 10 moves, the pulley 38 having the known diameter rotates and the length from the fulcrum 14 of the line 12 to the instruction point 10 changes. The rotary encoder 42 is attached to the shaft of the pulley 38. Pulses of a number corresponding to the amount of rotation of the pulley 38 are generated by the rotary encoder 42. By counting the number of pulses, the rotation amount of of the pulley 38 can be detected. Further, a change in the length from the fulcrum 14 of the line 12 to the instruction point 10 is calculated on the basis of the diameter of the pulley 38. Therefore, by giving an initial value of the length from the fulcrum 14 of the line 12 to the instruction point 10 and, further, by accumulating and adding the amounts of change, the length from the fulcrum 14 of the line 12 to the instruction point 10 can be measured in a real time manner.

The line length measuring section 24 does not necessarily use the rotary encoder 42 but can be also constructed in a manner such that a distance measuring instrument using a laser, an ultrasonic wave device, or the like is arranged at a fixed point just below the weight 40 attached to the tip of the line 12 and a distance from the fixed point to the weight 40 is measured and a distance from the fulcrum 14 to the instruction point 10 is obtained on the basis of the above distance.

The three-dimensional position calculating section 26 calculates the position of the instruction point 10 in the three-dimensional space on the basis of the lengths from the fulcrums 14-1 to 14-4 of the lines 12-1 to 12-4 to the instruction point 10 which are derived from the line length measuring section 24. Thus, by merely directly indicating a point in the three-dimensional space by using the instruction point 10, the position of the point can be input to the processing apparatus 16.

Figure 4:
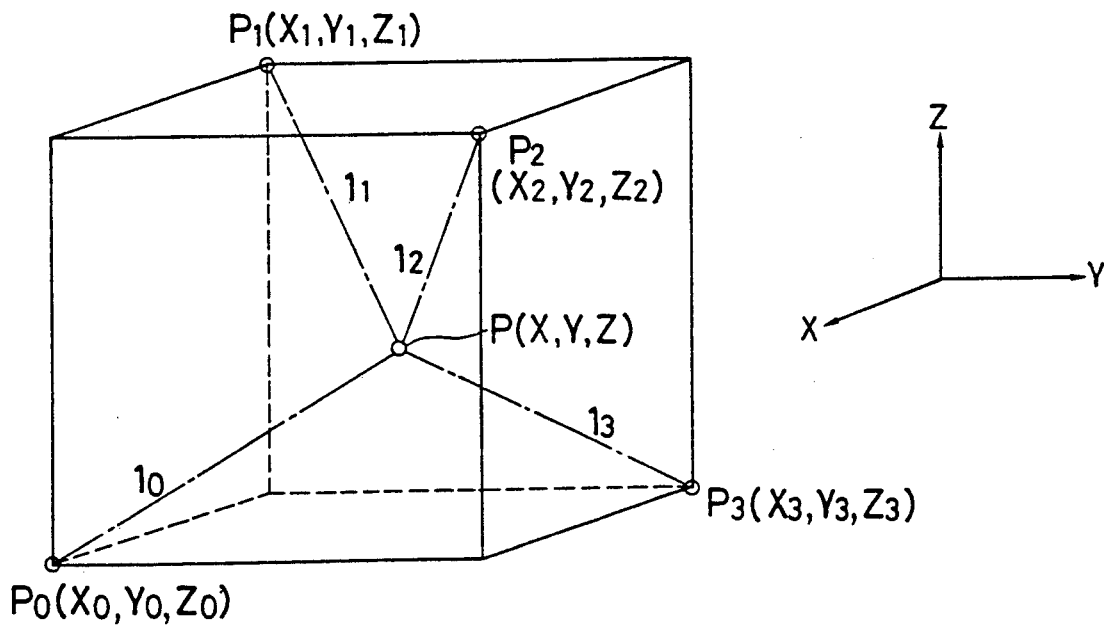
FIG. 4 is an explanatory diagram of a method of calculating a position of an instruction point in a three-dimensional space in accordance with the present invention.

FIG. 4 is an explanatory diagram of a method of calculating the position of the instruction point 10 in the three-dimensional space in FIG. 1.

In FIG. 4, assuming that the coordinate position of the instruction point 10 is set to $P(x, y, z)$, the coordinate positions of the fulcrums 14-1 to 14-4 are set to $P_0(x_0, y_0, z_0)$ to $P_3(x_3, y_3, z_3)$, and the lengths from the corresponding fulcrums 14-1 to 14-4 of the lines 12-1 to 12-4 having the variable lengths to the instruction point 10 are set to $l_0$ to $l_3$, respectively, the following equations (1) are satisfied.

$$\begin{aligned}(x - x_0)^2 + (y - y_0)^2 + (z - z_0)^2 &= l_0^2 \\ (x - x_1)^2 + (y - y_1)^2 + (z - z_1)^2 &= l_1^2 \\ (x - x_2)^2 + (y - y_2)^2 + (z - z_2)^2 &= l_2^2 \\ (x - x_3)^2 + (y - y_3)^2 + (z - z_3)^2 &= l_3 \end{aligned} \quad (1)$$

Since it is difficult to directly obtain x, y, and z from the equation (1), the equation (1) is transformed into, for example, the following three equations (2) which are obtained by calculating the differences between respective pairs of adjacent equations selected from among the equations (1).

$$(x_1 - x_0)x + (y_1 - y_0)y + (z_1 - z_0)z = l_1 - l_0 \quad (2)$$
$$(x_2 - x_1)x + (y_2 - y_1)y + (z_2 - z_1)z = l_2 - l_1$$
$$(x_3 - x_2)x + (y_3 - y_2)y + (z_3 - z_2)z = l_3 - l_2$$
where, $l_i = (x_i^2 + y_i^2 + z_i^2 + l_i^2)/2$
($i = 0$ to 3)

The equations (2) are simultaneous linear equations with three unknowns. The position P(x, y, z) of the instruction point 10 can be obtained by solving the equations (2).

In the above description, the line length measuring section 24 measures the lengths from the fulcrums 14-1 to 14-4 of the four lines 12-1 to 12-4 of the variable lengths to the instruction point 10. The three-dimensional position calculating section 26 calculates the three-dimensional position of the instruction point 10 on the basis of the lengths of the four lines 12-1 to 12-4 of the variable lengths and the positions of the fulcrums corresponding thereto. However, it is also possible to calculate the three-dimensional position of the instruction point 10 in a manner such that the line length measuring section 24 measures the lengths from the corresponding fulcrums of three of the four lines of the variable lengths to the instruction point 10 and the three-dimensional position calculating section 26 calculates the three-dimensional position of the instruction point 10 on the basis of the lengths of the three lines of the variable lengths and the positions of the fulcrums corresponding thereto.

That is, the following equations are satisfied by considering the three lines 12-1 to 12-3 of the variable lengths and the fulcrums 14-1 to 14-3 corresponding thereto.

$$(x - x_0)^2 + (y - y_0)^2 + (z - z_0)^2 = l_0^2 \quad (3)$$
$$(x - x_1)^2 + (y - y_1)^2 + (z - z_1)^2 = l_1^2$$
$$(x - x_2)^2 + (y - y_2)^2 + (z - z_2)^2 = l_2^2$$

Two equations, for instance, the following equations (4) are derived from the above equations (3).

$$(x_1 - x_0)x + (y_1 - y_0)y + (z_1 - z_0)z = l_1 - l_0 \quad (4)$$
$$(x_2 - x_1)x + (y_2 - y_1)y + (z_2 - z_1)z = l_2 - l_1$$
where, $l_i = (x_i^2 + y_i^2 + z_i^2)/2$
($i = 0$ to 2)

For instance, y and z are expressed by the equation of x from the equations (4) and are substituted for one of the equations (3), so that a quadratic equation of x is obtained. By solving the quadratic equation, x is obtained. Further, y and z are calculated in a manner similar to the case of x. Thus, the position P(x, y, z) of the instruction point 10 is obtained. However, in this case, since two points in the calculation of the instruction point 10 are solutions of the equations (3), it is necessary to determine the position of the instruction point 10 in consideration of the existence region of the predetermined instruction point 10.

The virtual object memory section 28 stores the information of a virtual object which virtually exists in the three-dimensional space which has previously been input as a virtual object data signal and the virtual object information which was updated by the virtual object updating section 34. As an expression of the virtual object, it is sufficient to use an expression such that it is possible to discriminate whether an arbitrary point exists inside or outside of the virtual object. For instance, assuming that the coordinates of an arbitrary point are set to (x, y, z), it is sufficient to enable such a discrimination to be performed by the following function.

$$f(x,y,z) = \begin{cases} 0 \text{ (inside)} \\ 1 \text{ (boundary)} \\ 2 \text{ (outside)} \end{cases} \quad (5)$$

As a practical method of expressing an object, there can be mentioned a polygon approximating method of expressing an object as a region which is surrounded by a number of small planes, a method of expressing an object by a logic operation of a primitive shape, or the like.

The contact discriminating section 30 receives the position of the instruction point 10 which is calculated by the three-dimensional position calculating section 26 and the virtual object information stored in the virtual object memory section 28 and determines whether or not the instruction point 10 and the virtual object are virtually in contact with each other in the three-dimensional space. That is, it is determined at which position for the virtual object the position P(x, y, z) of the instruction point 10 exists from the equation (5). When $f(x, y, z) = 0$ or 1, it is determined that the instruction point 10 is in contact with the virtual object.

If it is determined that the instruction point 10 is in contact with the virtual object on the basis of a contact discrimination signal which is output from the contact discriminating section 30, the drag generating section 32 feeds back a drag due to the contact with the virtual object to a human being who tries to move the instruction point 10 by limiting variable length operations such that the lines 12-1 to 12-4 of the variable lengths to hold the instruction point 10 are pulled out or returned and wound.

As a method of limiting the variable length operations of the lines 12-1 to 12-4 of the variable lengths, it is possible to limit the operations of the lines which are necessary to restrict the movement of the instruction point 10 into the virtual object side among the lines 12-1 to 12-4 of the variable lengths or, as a simpler method, the variable length operations of all of the four lines can be also limited.

On the other hand, degrees of limitation of the variable length operations of the lines 12-1 to 12-4 of the variable lengths can be also changed in accordance with the characteristics of the virtual object. For instance, assuming that a hard object which does not move, for instance, an object such that none of the deformation, movement, position change, and the like is permitted is used as a virtual object, it is sufficient to completely stop the variable length operations of the lines of the variable lengths. On the contrary, in the case of a virtual object in which the deformation, movement, or position change is allowed, it is sufficient to reduce the degrees of limitation of the variable length operations.

An example of a practical method to limit the variable length operation of the lines 12-1 to 12-4 of the variable lengths will now be described with reference to FIG. 3 as follows.

In FIG. 3, the line 12 passes between a coil 46 of a relay 44 and a movable iron member 48. When a current flows through the coil 46, the line 12 of the variable length is sandwiched between the coil 46 and the movable iron member 48 and the variable length operation is restricted. Therefore, the variable length operation of the line 12 of the variable length can be restricted or made effective by turning on/off the current flowing through the coil 46 of the relay 44 in accordance with the contact discrimination signal which is output from the contact discriminating section 30.

To reduce the degree of limitation of the variable length operation, it is sufficient to execute a duty cycle control such as to turn on/off the current flowing through the coil 46 of the relay 44 at a proper period within a period of time to limit the variable length operation.

The virtual object updating section 34 receives the position of the instruction point 10 which is calculated by the three-dimensional position calculating section 26 and the virtual object information stored in the virtual object memory section 28 and updates the virtual object information by executing deformation, movement, position change, or the like of the virtual object in accordance with the characteristics of the virtual object in a manner such that the position of the instruction point 10 is outside of the virtual object when the instruction point 10 entered the inside of the virtual object. Then, the updating section 34 outputs the updated virtual object information to the virtual object memory section 28. Due to the function of the virtual object updating section 34, the operation which was executed for the virtual object by the human being is actually reflected to the virtual object. In the case where none of the deformation, movement, position change, and the like of the virtual object is permitted, the virtual object updating section 34 is unnecessary.

The display section 36 displays the virtual object as if it actually existed in the three-dimensional space on the basis of the virtual object information stored in the virtual object memory section 28. Since a virtual object 100 is displayed as a stereo object by the display section 36, the virtual object 100 can be operated as if the operator directly operates the actually existing object by the finger tip while seeing it. However, the display section 36 is not always necessary in dependence on the use of the apparatus.

The display section 36 can be realized by a well-known stereoscopic vision method. That is, as shown in FIG. 1, the images of the virtual object which were seen by the right and left eyes are displayed on the CRT 18 by using a parallax of the human eyes and are seen through the special glasses 20, so that the virtual object is displayed as a stereo image. A red/blue glasses in an anagriph, a glasses with a liquid crystal shutter, or a polarizing glasses can be used as the special glasses 20.

Among the sections described above, the three-dimensional position calculating section 26, virtual object memory section 28, contact discriminating section 30, and virtual object updating section 34, and parts of the line length measuring section 24, drag generating section 32, and display section 36 may be realized by either software or special hardware in the processing apparatus 16 having a computer therein as shown in FIG. 1.

Figure 5:
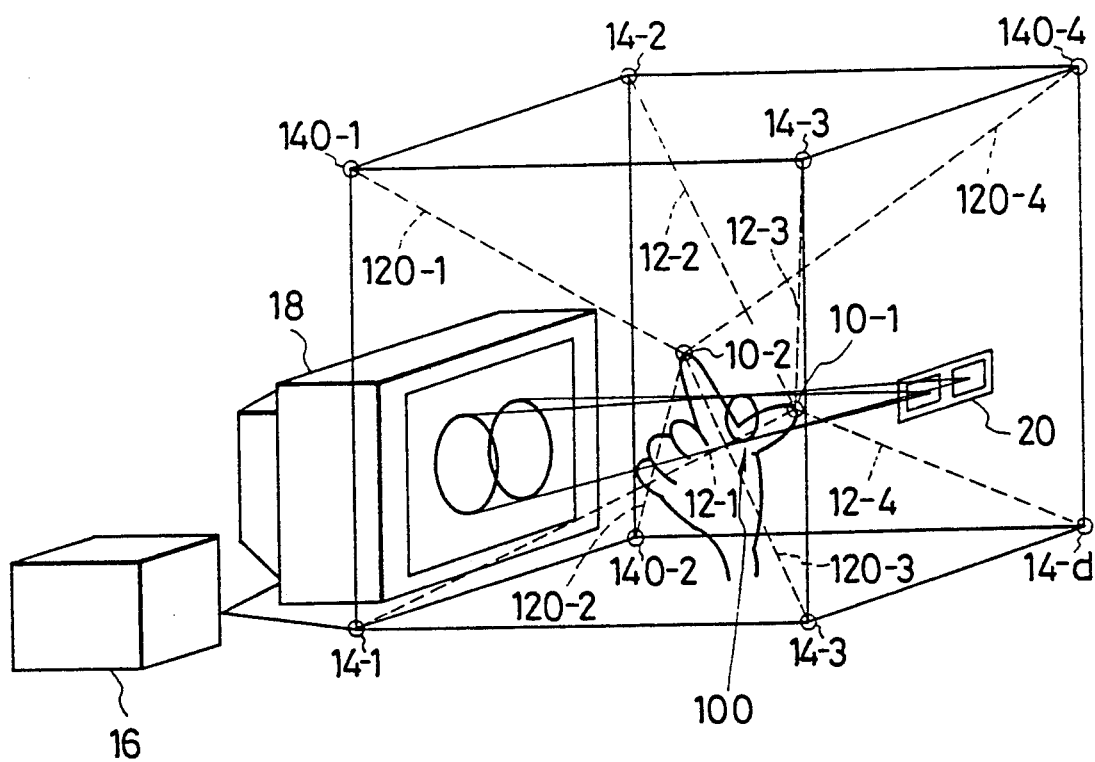
FIG. 5 is a diagram showing an external view of the apparatus according to a second embodiment of the present invention.

The second embodiment of the invention having two instruction points 10-1 and 10-2 as shown in FIG. 5 will now be described with reference to the block diagram of the first embodiment as shown in FIG. 2.

First, the instructing section of the second embodiment has two sets of instructing sections 22 of the first embodiment. That is, as shown in FIG. 5, for instance, in addition to four non-adjacent vertexes 14-1 to 14-4 of a cube which were used as fulcrums in the instructing section 22 of the first embodiment, the remaining four non-adjacent vertexes 140-1 to 140-4 are used as fulcrums. The instruction points 10-1 and 10-2 are held by every four lines 12-1 to 12-4 and 120-1 to 120-4 of variable lengths which are linearly rove from the two sets of fulcrums 14-1 to 14-4 and 140-1 to 140-4 and can stably exist at arbitrary points in a three-dimensional space. The functions and realizing methods of the vertexes 140-1 to 140-4 constructing the additional fulcrums, the lines 120-1 to 120-4 of the variable lengths, and the instruction point 10-2 are substantially the same as those of the instructing section 22 in the first embodiment. The positional relationship of the four fulcrums corresponding to the two instruction points 10-1 and 10-2 are not limited to the positional relationship of the vertexes which are not adjacent to each other. For instance, it is not always necessary to set all of the fulcrums to the positions of the vertexes of a cube. On the other hand, for instance, two instruction points 10-1 and 10-2 can also commonly use one to four points as fulcrums.

A line length measuring section of the second embodiment has a function corresponding to the case where the function to measure the lengths from the fulcrums 140-1 to 140-4 of the lines 120-1 to 120-4 of the variable lengths which were added to the instruction point 10-2 in substantially the same manner as the function to measure the lengths from the fulcrums of the four lines 12-1 to 12-4 of the variable lengths to the instruction point 10 in the line length measuring section 24 in the first embodiment was added to the line length measuring section 24 in the first embodiment.

A three-dimensional position calculating section in the second embodiment has a function corresponding to the case where the function to calculate the three-dimensional position of the added instruction point 10-2 in substantially the same manner as the function to calculate the three-dimensional position of the instruction point 10 in the three-dimensional position calculating section 26 in the first embodiment was added to the three-dimensional position calculating section 26 in the first embodiment.

A contact discriminating section in the second embodiment has a function corresponding to the case where the function to discriminate a contact between the added instruction point 10-2 and the virtual object 100 in substantially the same manner as the function to discriminate a contact between the instruction point 10 and the virtual object 100 in the contact discriminating section 30 in the first embodiment was added to the contact discriminating section 30 in the first embodiment.

A drag generating section in the second embodiment has a function corresponding to the case where the function to feed back a drag due to the contact with the virtual object 100 by limiting the variable length operations of the added lines 120-1 to 120-4 of the variable lengths in the case where the added instruction point 10-2 comes into contact with the virtual object 100 in substantially the same manner as the function to feed back a drag by the contact with the virtual object 100 by limiting the variable length operations of the lines 12-1 to 12-4 of the variable lengths in the case where the instruction point 10 comes into contact with the virtual object 100 in the drag generating section 32 in the first embodiment was added to the drag generating section 32 in the first embodiment.

A virtual object updating section in the second embodiment has a function corresponding to the case where the function to update the virtual object information by executing the deformation, movement, position change, or the like of the virtual object in accordance with the characteristics of the virtual object in a manner such that the position of the instruction point 10-2 is outside of the virtual object 100 when the instruction point 10-2 added in the second embodiment entered the inside of the virtual object 100 in substantially the same manner as the function to update the virtual object information by executing the deformation, movement, position change, or the like of the virtual object in accordance with the characteristics of the virtual object in a manner such that the position of the instruction point 10 is outside of the virtual object 100 when the instruction point 10 entered the inside of the virtual object 100 in the virtual object updating section 34 in the first embodiment was added to the virtual object updating section 34 in the first embodiment.

Further, a virtual object memory section and a display section in the second embodiment are substantially the same as the virtual object memory section 28 and the display section 36 in the first embodiment.

By providing two instruction points 10-1 and 10-2 as mentioned above, not only the three-dimensional positions of two points are merely input to the computer but also the operation to hold or grasp a virtual object can be executed by attaching, for instance, two instruction points to the thumb and forefinger. An operating efficiency for the virtual object is remarkably improved and more complicated operations can be performed.

Further, three or more instruction points can be also similarly used.

As another embodiment of the invention, a multi-joint robot arm or the like is used as an instructing section 22 and one point on the robot arm is used as an instruction point or an instruction point can be also attached to the robot arm. In this case, as an instructing position measuring section corresponding to the line length measuring section 24, the position of the instruction point is measured from an arm length of the robot arm and angles of the joints. Moreover, the drag generating section 32 can also limit the motion of the robot arm.

The virtual object updating section 34 and the display section 36 are not essential in the invention as mentioned above. For instance, in the case of applying the three-dimensional input apparatus according to the invention to a purpose for teaching an object shape to a blind person, the virtual object updating section 28 and the display section 36 are unnecessary.

As mentioned above, according to the invention, by directly instructing a position in a three-dimensional space, the position can be input to the computer and in the case where the instruction point was come into contact with a virtual object stored in the computer, a drag is fed back, so that the operation can be executed to the virtual object. A smooth interface between the human being and the computer can be realized.

What is claimed is:

1. A three-dimensional input apparatus comprising:
   an instructing means which positions an instruction point in a three-dimensional space and movably supports the instruction point in the three-dimensional space by a finger tip;
   an instructing position measuring means for measuring a position of the instruction point;
   a virtual object memory means for storing and outputting information of a virtual object which virtually exists in the three-dimensional space;
   a contact discriminating means for determining whether or not the instruction point is virtually in contact with the virtual object in the three-dimensional space on the basis of the measured position of the instruction point which is output from the instructing position measuring means and the virtual object information which is output from the virtual object memory means; and
   a drag generating means for selectively providing resistance to movement of the instruction point on the basis of a contact discrimination signal which is output from the contact discriminating means;
   wherein the instructing means further independently movably positions an additional instruction point in the three-dimensional space and supports the additional instruction point by an additional finger tip.

2. A three-dimensional input apparatus comprising:
   an instructing means which positions an instruction point in a three-dimensional space and movably supports the instruction point in the three-dimensional space by a finger tip;
   an instructing position measuring means for measuring a position of the instruction point;
   a virtual object memory means for storing and outputting information of a virtual object which virtually exists in the three-dimensional space;
   a contact discriminating means for determining whether or not the instruction point is virtually in contact with the virtual object in the three-dimensional space on the basis of the measured position of the instruction point which is output from the instructing position measuring means and the virtual object information which is output from the virtual object memory means; and
   a drag generating means for selectively providing resistance to movement of the instruction point on the basis of a contact discrimination signal which is output from the contact discriminating means;
   wherein the instructing means positions the instruction point in the three-dimensional space by four lines of variable lengths which were linearly rove one by one from four fulcrums in the three-dimensional space.

3. An apparatus according to claim 2, wherein the instructing position measuring means comprises:
   a line length measuring means for measuring lengths from the fulcrums of at least three of the four lines of variable lengths to the instruction point; and
   a three-dimensional position calculating means for calculating a three-dimensional position of the instruction point on the basis of the lengths from the fulcrums of at least three of the four lines to the instruction point which are output from the line length measuring means and the positions of the fulcrums which reeve at least three of the four lines.

4. An apparatus according to claim 2, wherein the instructing position measuring means comprises:
   a line length measuring means for measuring lengths from the fulcrums of the four lines to the instruction point; and
   a three-dimensional position calculating means for calculating a three-dimensional position of the instruction point on the basis of the lengths from the fulcrums of the four lines to the instruction point which are output from the line length measuring means and the positions of the fulcrums which reeve the four lines.

5. An apparatus according to claim 2, wherein the drag generating means limits the length of each of the lines of variable lengths which position the instruction point.

6. A three-dimensional input apparatus comprising:

an instructing means which positions an instruction point in a three-dimensional space and movably supports the instruction point in the three-dimensional space by a finger tip;

an instructing position measuring means for measuring a position of the instruction point;

a virtual object memory means for storing and outputting information of a virtual object which virtually exists in the three-dimensional space;

a contact discriminating means for determining whether or not the instruction point is virtually in contact with the virtual object in the three-dimensional space on the basis of the measured position of the instruction point which is output from the instructing position measuring means and the virtual object information which is output from the virtual object memory means;

a drag generating means for selectively providing resistance to movement of the instruction point on the basis of a contact discrimination signal which is output from the contact discriminating means;

a virtual object updating means for updating the virtual object information of the virtual object memory means by executing a deformation, a movement, or a position change of the virtual object in accordance with characteristics of the virtual object in a manner such that the position of the instruction point is initially outside of the virtual object when the instruction point is moved so as to enter the inside of the virtual object on the basis of the measured position of the instruction point which was measured by the instructing position measuring means and the virtual object information stored in the virtual object memory means; and a display means for displaying the virtual object as if it actually existed in the three-dimensional space on the basis of the virtual object information stored in the virtual object memory means;

wherein the instructing means further independently movably positions an additional instruction point in the three-dimensional space and supports the additional instruction point by an additional finger tip.

7. A three-dimensional input apparatus comprising:

an instruction means which positions an instruction point in a three-dimensional space and movably supports the instruction point in the three-dimensional space by a finger tip;

an instructing position measuring means for measuring a position of the instruction point;

a virtual object memory means for storing and outputting information of a virtual object which virtually exists in the three-dimensional space;

a contact discriminating means for determining whether or not the instruction point is virtually in contact with the virtual object in the three-dimensional space on the basis of the measured position of the instruction point which is output from the instructing position measuring means and the virtual object information which is output from the virtual object memory means;

a drag generating means for selectively providing resistance to movement of the instruction point on the basis of a contact discrimination signal which is output from the contact discriminating means;

a virtual object updating means for updating the virtual object information of the virtual object memory means by executing a deformation, a movement, or a position change of the virtual object in accordance with characteristics of the virtual object in a manner such that the position of the instruction point is initially outside of the virtual object when the instruction point is moved so as to enter the inside of the virtual object on the basis of the measured position of the instruction point which was measured by the instructing position measuring means and the virtual object information stored in the virtual object memory means; and a display means for displaying the virtual object as if it actually existed in the three-dimensional space on the basis of the virtual object information stored in the virtual object memory means;

wherein the instructing means positions the instruction point in the three-dimensional space by four lines of variable lengths which were linearly rove one by one from four fulcrums in the three-dimensional space;

wherein the instructing means positions the instruction point in the three-dimensional space by four lines of variable lengths which were linearly rove one by one from four fulcrums in the three-dimensional space.

8. An apparatus according to claim 7, wherein the instructing position measuring means comprises:

a line length measuring means for measuring lengths from the fulcrums of at least three of the four lines of variable lengths to the instruction point; and a three-dimensional position calculating means for calculating a three-dimensional position of the instruction point on the basis of the lengths from the fulcrums of at lest three of the four lines to the instruction point which are output from the line length measuring means and the positions of the fulcrums which reeve at least three of the four lines.

9. An apparatus according to claim 7, wherein the instructing position measuring means comprises:

a line length measuring means for measuring lengths from the fulcrums of the four lines to the instruction point; and a three-dimensional position calculating means for calculating a three-dimensional position of the instruction point of the instructing means on the basis of the lengths from the fulcrums of the four lines to the instruction point of the instructing means which are output from the line length measuring means and the positions of the fulcrums which reeve the four lines.

10. An apparatus according to claim 7, wherein the drag generating means limits the length of each of the lines of variable lengths which position the instruction point.

* * * * *